Figure 1:
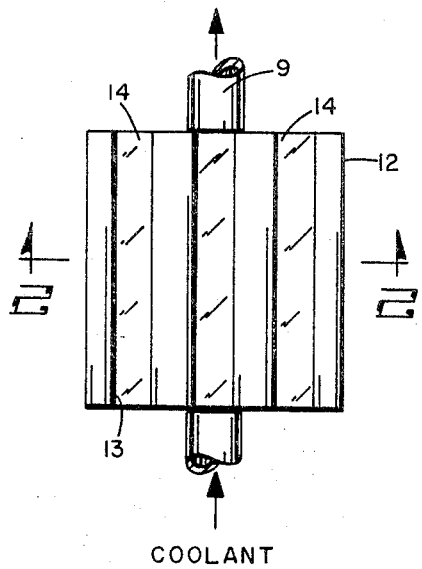

Oct. 24, 1967  J. F. LOUIS  3,349,260
METHOD OF IMPROVING THE PERFORMANCE OF ELECTRODES
IN MAGNETOHYDRODYNAMIC DEVICES
Filed Jan. 6, 1964

COOLANT

JEAN F. LOUIS
INVENTOR.

BY Alden D. Redfield
Melvin E. Frederick
ATTORNEYS 3,349,260
METHOD OF IMPROVING THE PERFORMANCE OF ELECTRODES IN MAGNETOHYDRODYNAMIC DEVICES
Jean Francois Louis, Boston, Mass., assignor to Avco Corporation, Cincinnati, Ohio, a corporation of Delaware
Filed Jan. 6, 1964, Ser. No. 335,772
12 Claims. (Cl. 310—11)

The present invention relates generally to magnetohydrodynamic (hereinafter referred to as "MHD") devices employing a hot electrically conductive fluid or plasma, and more particularly to a method of improving the performance of the electrodes of such devices.

MHD generators produce electric power by movement of electrically conductive fluid or plasma relative to a magnetic field. The plasma employed is usually an electrically conductive gas from a high temperature, high pressure source. From the source, the plasma flows through the generator and by virtue of its movement relative to the magnetic field, induces an electromotive force between opposed electrodes within the generator. The gas comprising the plasma may exhaust to a sink, which may simply be the atmosphere; or, in more sophisticated systems, the gas may exhaust to a recovery system including pumping means for returning the gas to the source. Conductivity of the gas may be produced thermally, and/or by seeding with a substance that ionizes readily at the operating temperature of the generator. For seeding purposes, sodium, potassium, cesium, or an alkali metal vapor may be used. Regardless of the gas used, or the manner of seeding, the resulting gases comprise a mixture of electrons, positive ions, and neutral atoms which, for convenience, is termed "plasma."

An MHD generator of the type described normally employs a stationary magnetic field and unidirectional gas flow. As a result, such a generator is inherently a source of direct current. If alternating current is desired, some form of auxiliary equipment is usually provided to invert the direct current to alternating current.

MHD pumps use the induction motor principle, i.e., a conductive liquid is considered to be a wire or conductor suspended in a magnetic field and has a current passed through it mutually perpendicular to the length of the conductor and the magnetic field. Under these conditions, a force is induced in the conductor which tends to move it in a direction which is mutually perpendicular to the current and magnetic flux. This force, when applied to a liquid conductor, propels the liquid conductor in the same manner as a conventional pump. Such pumps have become quite common in laboratory work and in connection with the movement of liquid sodium and liquid potassium in nuclear reactors. Electrodes for passing electric current through the liquid conductor within the magnetic field are located in what is generally referred to as the throat of the pump.

MHD accelerators are constructed and operate in substantially the same manner as MHD pumps, the difference being that whereas MHD pumps are generally used for pumping liquids, MHD accelerators are generally used for accelerating an electrically conductive gas.

In my patent application Ser. No. 280,273, filed May 14, 1963, to which reference is made, there is disclosed a high temperature anisotropic and nonconsumable electrode designed for operating in an oxidizing atmosphere such as air or gases resulting from the combustion of a fuel and oxygen. The extreme end of the electrode in contact with the plasma is comprised of a heat resistant metal provided with a plurality of recesses in which is fixedly disposed a high temperature and electron emissive material such as zirconium or chromic oxide. The recesses are preferably elongated and orientated normal to the direction of flow of the plasma. The aforementioned metal and the high temperature material in contact with the plasma are erosion resistant to and retain their integrity at temperatures of the products of combustion, the recesses being provided so that the metal bears the shear stresses due to gas friction which the electron emissive material would not be able to withstand. Cooling of the metallic portion of the electrode is provided for continuous operation of long duration and particularly when the plasma is initially at about 3000° K. as is the case for a suitable electrically-conductive gas comprised of products of combustion. Typically, with cooling, the exposed surface of the electron emissive material may be at a temperature of 2000° K., while the metallic portion of the electrode remote from the plasma is at a temperature of only about 600° K.–1500° K.

The present invention is directed to improving the performance of electrodes of the type disclosed in my aforementioned patent application. Retention of the electron emissive material is determined by essentially evaporation of the material, erosion of the electrode material due to the friction forces, corrosion by products of combustion, resistance to thermal stresses, and deposition of materials on the electrode surface. Because of the oxidizing atmosphere and the temperature thereof in MHD generators utilizing products of combustion, zirconium and chromic oxides are preferred because of their low resistivity at high temperature, small coefficient of thermal expansion, good resistance to thermal shock, and low vapor pressure. For example, zirconium oxide has a small vapor pressure, e.g., $4.5 \times 10^{-5}$ mm. Hg at 2000° K.

While some fuels are essentially free from the impurities which contribute to the corrosion of numerous materials at high temperature, industrial fuel such as coal or fuel oils contain appreciable concentrations of corrosive agents such as oxides of silicium, iron, vanadium, and aluminum. Corrosion is the chemical attack by different ash constituents found in combustion gases. In the ash, $Fe_2O_3$, $Mn_3O_4$, $Al_2O_3$, $SiO_2$, and $K_2O$ are considered to be the principal corrosive agents.

It has been found that the most damaging corrosive action results from the formation of a liquid phase containing fuel impurities and the electron emissive material. When this liquid phase has a fusion point lower than the operating temperature of the electron emissive material, the gas friction causes the liquid to flow and, accordingly, results in an electrode weight loss. At the same time, the temperature of the electrode is reduced below the threshold of sufficient electron emission for the required current. This active corrision results in a rapid deterioration of electrode performance.

In accordance with the present invention, the electrodes are replenished by injecting into or providing in the gas stream flowing over the electrode an electron emissive material which impinges on the electrode and adheres to it and where necessary the atmosphere over the electrode surface is controlled by the introduction of additives to the gas stream flowing over the electrodes. The additives for controlling the atmosphere over the electrode surface can either be introduced with the main fuel or through conventional injectors located upstream of the electrodes. The selection of the additive is made on the basis of its capability to raise above the operating temperature of the electrode surface the fusion point of any phase between materials contained in the gas and the electron emissive material forming part of the electrode. The electrodes are replenished by providing in the gas stream flowing over the electrodes a material which at least includes in a suitable form the material used for the electrodes, e.g., zirconia. If desired, the electron emissive material may also be included with the fuel.

It is therefore a principal object of the present invention to improve the performance of electrodes in MHD devices.

Another object is to reduce corrosion of electrodes comprising electron emissive ceramic in MHD devices utilizing products of combustion.

A still further object is to reduce the effects of erosion of electrodes comprising electron emissive ceramics in MHD devices utilizing products of combustion.

A still further object is to effect replenishment of a high temperature electron emissive material forming part of an electrode in an MHD device utilizing products of combustion.

Figure 2:
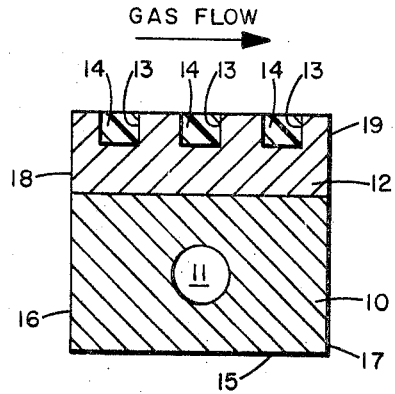

The novel features that are considered characteristic of the present invention are set forth in the appended claims; the invention itself, however, both as to its organization and method of operation, together with additional objects and advantages thereof, will best be understood from the following description of the specific embodiment when read in conjunction with the accompanying drawings, in which:

FIGURE 1 is a top view of an electrode the performance of which is improved in accordance with the present invention; and FIGURE 2 is taken on line 2—2 of FIGURE 1.

Attention is now directed to FIGURE 1 and FIGURE 2 which illustrate an electrode constructed in accordance with my aforementioned patent application. As shown in these figures, the electrode may be comprised of a metallic base portion 10 such as, for example, copper provided with a passage 11 to receive a coolant via pipes 9, an end portion 12 composed of for example, stainless steel provided with a plurality of grooves or recesses 13 extending over the length of the electrode. Each groove or recess 13 is filled with an electron emitting material 14 more fully described below.

For the minimum effect of friction, the electrode is orientated such that the elongated grooves or recesses are normal to the direction of gas flow to prevent the electron emissive material from being driven out of the recesses. The use of a stainless steel cap permits the existence of a higher temperature at the electrode walls of the duct and therefore a higher temperature at the boundary layer which in turn increases the efficiency of MHD devices. Further, a stainless steel cap provides greater erosion resistance than would be provided by copper or the like.

When mounted in an MHD device, the electrodes must of course be electrically insulated to prevent short circuiting. Since the insulation is generally provided separately from the electrode, it is not shown. However, if desired, the sides and bottom of the metallic portion of the electrode may be covered by any suitable insulating material. Generally, Teflon or the like is provided at the bottom surface 15 and at portions 16 and 17 of the sides adjacent the bottom surface 15 and an electrically insulating refractory material is provided at the upper portions 18 and 19 of the sides of the electrode.

Present day electrically-conductive gases or plasmas used in MHD devices are either noble gases heated to a temperature of at least 2000° K. or more, or products of combustion at a temperature of about 3000° K. Accordingly, an electrode in accordance with the present invention intended for use in MHD devices in any event must be exposed to temperatures in excess of 2000° K. that may vary over a considerable range and most likely exposed to a corrosive and/or oxidizing plasma. Under these conditions, a ceramic material doped with an electrically-emissive material is most suitable.

The material disposed in grooves 13 should not be oxidizable when exposed to the electrically-conductive gas; it should have a low coefficient of expansion to prevent or at least minimize cracking, spalling, and the like, and it should be electron emissive. Further, the term "ceramic material" as used in the claims means a material having an electron emissivity of at least about one ampere per square centimeter at about 1500° K., a melting point in excess of about 1500° K., a thermal conductivity of about .03 calories centimeter per second per square centimeter per degree centigrade, and an electrical resistivity of about 50 ohms centimeter at about 1500° K. For the case where the plasma is composed of the products of combustion, the ceramic material must be an oxide, e.g., zirconium or chromic oxide. Because of their stability at about 2000° K., zirconium oxide or chromic oxide is preferred, zirconium oxide doped with calcium oxide being the most desirable as disclosed in my aforementioned patent application.

While electrodes as disclosed in my aforementioned patent application are superior to other types of electrodes used or suggested for MHD devices, they are subject to the previously noted effect of corrosive agents in the plasma and the erosive effect of the plasma. Accordingly, the present invention is particularly directed to overcoming these deleterious effects by the introduction of suitable additives into the plasma upstream of the electrodes.

Assuming a suitably doped electron emissive material such as, for example, zirconium oxide is present in the grooves 13 and a plasma temperature of about 3000° K., erosion of the zirconium oxide may be overcome in accordance with the present invention by injecting zirconium into or providing zirconium oxide in the plasma flowing over the electrodes. The vapor pressure of zirconium oxide being low at the temperatures under consideration, this material will deposit on the electrodes if the concentration of zirconium oxide in the gas is maintained above $10^{-5}$ molar concentration. Deposition of zirconium oxide is preferably accomplished by adding zircon ($ZO_2$—$SiO_2$) to the plasma. In the high temperature plasma comprising products of combustion, the zircon decomposes at 1700° C. into zirconium oxide and silicon oxide. The decomposition of the zircon liberates the zirconia and forms zirconium oxide in the plasma. The plasma is maintained at a temperature of about 3000° K. which raises the vapor pressure of the zirconium oxide to levels such that condensation takes place on the colder electrodes, the exposed surfaces of which are maintained at about 2000° K. to obtain sufficient thermal emission. Because of cooling of the electrodes, it will be understood that there is a temperature gradient across the material disposed in the grooves. Accordingly, the temperature of the surface of the material in the grooves is measured at the center thereof.

However, as pointed out hereinabove, silicon oxide is a corrosive agent. Accordingly, an oxide of an alkali earth such as, for example, calcium oxide, is also added to the plasma along with the zircon to raise the fusion point of the silicon oxide in the plasma and the zirconium oxide forming part of the electrodes above the operating temperature of the electrode surface, thereby preventing the existence of a liquid phase at the operating temperature of the electrode surface. The solid phase so formed, if it adheres to the electrode, will form only a very thin film, the majority of the solid phase which comes in contact with the electrode being removed by the velocity of the plasma. When such a thin film is formed on the electrodes, the electrode performance is only slightly perturbed and appears as a very small increase in electrode internal resistance.

A concentration of zirconia of about 1%–2% by weight of the mass flow is sufficient to fill the grooves in about five minutes depending on the volume of the grooves to be filled. Thus, the grooves may be substantially filled if zirconia is provided in sufficient quantity or, alternately, if the zirconia is continuously provided in an amount of about .01% by weight of the mass flow, the material removed by normal erosion may be constantly replaced.

In the event that the plasma contains substantial amounts of corrosive agents, the amount of calcium oxide may be increased to substantially eliminate corrosion. Generally speaking, the amount of calcium oxide required to control corrosion depends on the amount of corrosive agents in the plasma. Thus, when coal is used, for example, the required amount of calcium oxide may be determined by separately burning a quantity of the coal and analyzing the ash produced thereby to determine, for example, the amount of silicon oxide, iron oxide, and other corrosive products that are present. Having this information, conventional phase diagrams may then be used to determine the amount of calcium oxide necessary to raise the fusion point of any phase between the silicon oxide and the zirconium oxide above the operating temperature of the surface of the zirconium oxide.

The various features and advantages of the invention are thought to be clear from the foregoing description. Various other features and advantages not specifically enumerated will undoubtedly occur to those versed in the art, as likewise will many variations and modifications of the embodiment of the invention illustrated, all of which may be achieved without departing from the spirit and scope of the invention as defined by the following claims.

I claim:

1. In the method of operating an MHD generator wherein a duct conveys a moving stream of thermally ionized and electrically conductive gas between opposed electrodes and through magnetic flux at said electrodes, the exposed end surface of said electrodes having recesses exposed to and disposed normal to the direction of flow of said gas, the steps comprising:
   (a) providing in the gas upstream of said electrodes a ceramic material having an electron emissivity of at least about one ampere per square centimeter at about 1500° K.;
   (b) maintaining the temperature of said gas at said electrodes in excess of about 2000° K.; and
   (c) maintaining the temperature of each said end surface greater than that required to provide said electron emissivity and less than that at which said material softens.

2. In the method of operating an MHD generator wherein a duct conveys a moving stream of thermally ionized and electrically conductive gas between opposed electrodes and through magnetic flux at said electrodes, the exposed end surface of said electrodes having recesses exposed to and disposed normal to the direction of flow of said gas, the steps comprising:
   (a) providing in the gas upstream of said electrodes a ceramic material having an electron emissivity of at least about one ampere per square centimeter at about 1500° K., a melting point in excess of about 1500° K., and an electrical resistivity of about 50 ohms centimeter at about 1500° K.;
   (b) maintaining the temperature of said gas at said electrodes in excess of about 2000° K.; and
   (c) maintaining the temperature of each said end surface greater than that required to provide said electron emissivity and less than that at which said material softens.

3. In the method of operating an MHD generator wherein a duct conveys a moving stream of thermally ionized and electrically conductive gas between opposed electrodes and through magnetic flux at said electrodes, the exposed end surface of said electrodes having recesses exposed to and disposed normal to the direction of flow of said gas, the steps comprising:
   (a) providing in the gas upstream of said electrodes a ceramic material having an electron emissivity of at least about one ampere per square centimeter at about 1500° K., a melting point in excess of about 1500° K., and an electrical resistivity of about 50 ohms centimeter at about 1500° K.;
   (b) providing in the gas upstream of said electrodes an oxide of an alkali earth;
   (c) maintaining the temperature of said gas at said electrodes in excess of about 2000° K.; and
   (d) maintaining the temperature of each said end surface greater than that required to provide said electron emissivity and less than that at which said material softens.

4. In the method of operating an MHD generator wherein a duct conveys a moving stream of thermally ionized and electrically conductive gas comprising products of combustion between opposed electrodes, the exposed end surface of said electrodes having recesses exposed to and disposed normal to the direction of flow of said gas, the steps comprising:
   (a) providing in the gas upstream of said electrodes a ceramic material having an electron emissivity of at least about one ampere per square centimeter at about 1500° K., a melting point in excess of about 1500° K., and an electrical resistivity of about 50 ohms centimeter at about 1500° K.;
   (b) providing in the gas upstream of said electrodes an oxide of an alkali earth;
   (c) maintaining the temperature of said gas at said electrodes in excess of about 2000° K.; and
   (d) maintaining the temperature of each said end surface greater than that required to provide said electron emissivity and less than that at which said material softens.

5. In the method of operating an MHD generator wherein a duct conveys a moving stream of thermally ionized and electrically conductive gas comprising products of combustion between opposed electrodes and through magnetic flux at said electrodes, the exposed end surface of said electrodes having recesses exposed to and disposed normal to the direction of flow of said gas, the steps comprising:
   (a) providing in the gas upstream of said electrodes a molar concentration of at least about $10^{-5}$ of a ceramic material having an electron emissivity of at least about one ampere per square centimeter at about 1500° K.;
   (b) maintaining the temperature, velocity and pressure of said gas at predetermined values to at least in part soften said material at said electrodes, said temperature being in excess of about 2000° K.; and
   (c) maintaining the temperature of each said end surface greater than that required to provide said electron emissivity and less than that at which said material softens.

6. The combination as defined in claim 5 wherein said material is zircon.

7. The combination as defined in claim 5 wherein said material is zirconia.

8. The combination as defined in claim 5 where said material is chromite.

9. In the method of operating an MHD generator wherein a duct conveys a moving stream of thermally ionized and electrically conductive gas between opposed electrodes and through magnetic flux at said electrodes, the exposed end surface of said electrodes having recesses exposed to and disposed normal to the direction of flow of said gas, the steps comprising:
   (a) providing in the gas upstream of said electrodes particles of a material selected from the group consisting of zircon, zirconia, and chromite;
   (b) maintaining the temperature, velocity, and pressure of said gas at predetermined values to at least in part soften said material at said electrodes; and
   (c) maintaining the temperature of each said end surface greater than that required to render said material electron emissive and less than the temperature at which said material softens.

10. In the method of operating an MHD generator wherein a duct conveys a moving stream of thermally ionized and electrically conductive gas between opposed electrodes and through magnetic flux at said electrodes, the exposed end surface of said electrodes having recesses exposed to and disposed normal to the direction of flow of said gas, the steps comprising:
    (a) providing in the gas upstream of said electrodes particles of a material selected from the group consisting of zircon, zirconia, and chromite;
(b) maintaining the temperature, velocity, and pressure of said gas at predetermined values to at least in part soften said material at said electrodes, said temperature being in excess of about 2000° K.; and
(c) maintaining the temperature of each said end surface greater than that required to render said material electron emissive and less than the temperature at which said material softens.

11. In the method of operating an MHD generator wherein a duct conveys a moving stream of thermally ionized and electrically conductive gas between opposed electrodes and through magnetic flux at said electrodes, the exposed end surface of said electrodes having recesses exposed to and disposed normal to the direction of flow of said gas, the steps comprising:
(a) providing in the gas upstream of said electrodes particles of a material selected from the group consisting of zircon, zirconia, and chromite;
(b) maintaining the temperature, velocity, and pressure of said gas at predetermined values to at least in part soften said material at said electrodes, said temperature being in excess of about 2000° K.; and
(c) maintaining the temperature of each said end surface greater than about 1500° K. and less than about 2000° K.

12. In the method of operating an MHD generator wherein a duct conveys a moving stream of thermally ionized and electrically conductive gas between opposed electrodes and through magnetic flux at said electrodes, the exposed end surface of said electrodes having recesses exposed to and disposed normal to the direction of flow of said gas, the steps comprising:
(a) providing in the gas upstream of said electrodes particles of a material selected from the group consisting of zircon, zirconia, and chromite;
(b) maintaining the temperature, velocity, and pressure of said gas at predetermined values to at least in part soften said material at said electrodes;
(c) maintaining the temperature of each said end surface at a temperature greater than that required to render said material electron emissive and less than the temperature at which said material softens; and
(d) providing an oxide of an alkali earth in the gas upstream of said electrodes.

No references cited.

MILTON O. HIRSHFIELD, *Primary Examiner.*

D. X. SLINEY, *Assistant Examiner.*